UNITED STATES PATENT OFFICE 2,631,065

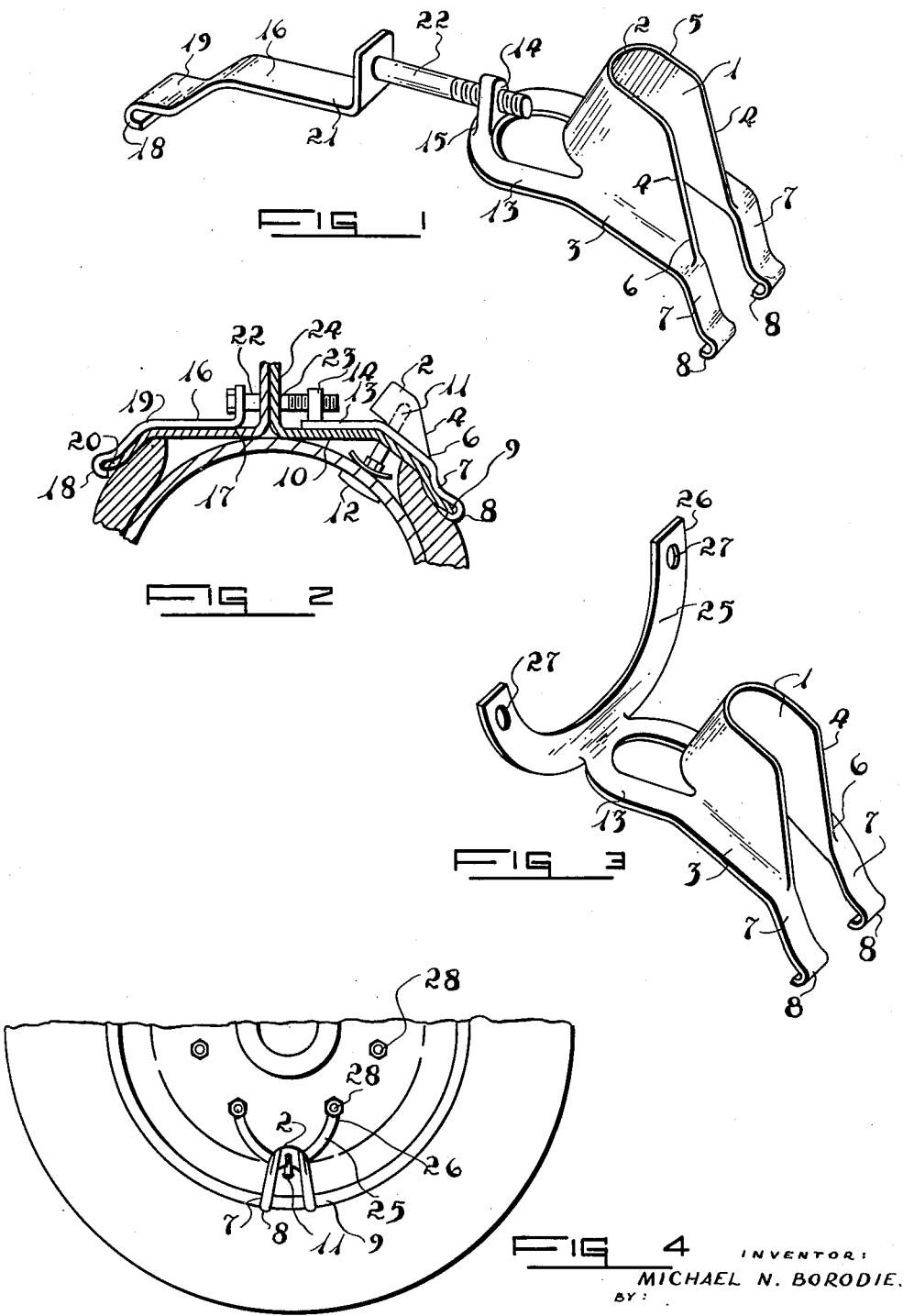

TIRE VALVE GUARD

Michael N. Borodie, Oakburn, Manitoba, Canada

Application October 8, 1949, Serial No. 120,281

3 Claims. (Cl. 301—5)

My invention relates to new and useful improvements in guards for pneumatic tire inflation valves, an object of my invention being to provide a device of the character herewithin described which protects the projecting portion of the tire valve from being sheared off or otherwise damaged by obstructions such as rocks, logs and the like encountered when the tractor is operated over rough territory.

A further object of my invention is to provide a device of the character herewithin described which is readily adaptable to tractor wheels having apertured or solid webs.

Another object of my invention is to provide a device of the character herewithin described the use of which does not interfere with the normal function of inflation and deflation of the tire by the valve.

A still further object of my invention is to provide a device of the character herewithin described which is readily assembled and dismantled from the wheel of the tractor.

A yet further object of my invention is to provide a device of the character herewithin described which is economical in manufacture, rugged in construction, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a perspective view of one embodiment of my device per se.

Figure 2 is a reduced fragmentary section of a wheel rim and tire with my device in situ.

Figure 3 is a perspective view of my device showing an alternative form of attachment.

Figure 4 is a reduced side elevation of a tractor wheel with the second embodiment of my device in situ.

In the drawings like characters of reference indicate corresponding parts in the different figures.

The projecting portion of conventional pneumatic tire inflation valves which normally is of several inches in length, is readily sheared or otherwise damaged when the tractor is operating in rough territory containing rocks, logs or the like. If the valve is sheared off, normally the pneumatic inner tube is severely damaged necessitating a new replacement or at the very least a relatively expensive repair necessitating the re-vulcanisation of a replacement valve within the tube. Minor injuries to the threaded portion of the conventional valve often occur causing considerable difficulty in the attachment of such items as the valve cap, as well as the screw-threaded type of tire pump inflator. I have therefore designed a relatively rugged guard which partially surrounds the projecting portion of the tire valve thereby preventing same from becoming damaged or sheared.

Proceeding now to describe my invention in detail, it will be seen upon reference to the accompanying drawing that I have provided what I define as a valve shrouding element 1, which consists of a semi-cylindrical, vertical wall portion 2 mounted upon a flanged base 3 and having what I describe as a pair of tapering flanks 4 extending downwardly from the upper edge 5 of the wall portion to the aforementioned flanged base 3. These flanks are extensions of the wall portion and are desirably formed integrally therewith and welded to the base 3.

At the junction of the lower ends 6 of the flanks with the base 3, a pair of straps 7 are provided having engaging claws 8 upon the distal ends thereof which are adapted to engage one rim 9 of an associated rim flange 10 as will hereinafter be described. These straps and claws are angulated to conform with the cross sectional configuration of the rim and flange over which they are designed to lie so that the aforementioned shroud 1 partially encloses the portion 11 of the valve 12 extending through the rim flange 10.

The base 3 extends rearwardly, and, in this embodiment, is semi-circularly curved to form an attaching plate 13 upon which means are provided to secure the valve shrouding element 1 to the associated wheel flange.

In the embodiment shown in Figures 1 and 2, I have provided an upstanding screw-threaded lug 14 adjacent the rear locus of curvature 15 of the attaching plate together with an angulated strip 16 having a configuration complementary to the cross sectional configuration of the opposite or inner rim flange 17 over which it is adapted to be situated. An engaging claw 18 is provided upon distal end 19 of the strap 16 and engages the inner wheel rim 20.

The inner end 21 of the strap 16 is angulated upwardly substantially at right angles to the strap and apertured to receive rotatably the adjustable connecting means 22 in the form of a bolt extending through the aperture in the inner end of the strap 21 and through an aperture in the lug 14 within which aperture it is screw-threadedly engageable. The bolt 22 is designed to pass through one of the conventional apertures 23 situated within the web 24 of the wheel adjacent the tire valve 12 so that it spans the rim flanges 10 and 17 as clearly shown in the cross sectional view of Figure 2.

In operation, the shroud 1 is positioned around the extending portion 11 of the valve 12 with the claws 8 engaging the rim 9. The strap 16 is placed upon the opposite rim 20 with the claw 18 engaging therearound whereupon the bolt 22 is engaged within lugs 14 and tightened to draw the assembly together spanning the rim flanges and tensioning the claws 8 and 18 thus preventing movement of the assembly upon the wheel. Under these conditions, it will be appreciated that the extending portion 11 of the valve 12 is protected against damage by rocks, logs or the like.

In the alternative embodiment of my device shown in Figures 3 and 4, the means to secure the valve shrouding element 1 to the wheel is particularly suited for use upon wheels not provided with the conventional apertures 23 within the web 24.

The securing means comprises in this embodiment, a substantially semi-circular securing strap 25 attached to the rear of the attaching plate 13 and substantially at right angles thereto. The extremities 26 of the strap 25 are apertured as at 27 and are detachably secured to the associated wheel bolts 28 adjacent the valve 12. It will be appreciated that the strap 25 may be angulated in order to conform with the cross sectional configuration of the wheel and rim in order that the extremities 26 seat snugly behind the nuts attaching the wheel to the bolts 28. In this embodiment the shroud 1 together with the strap 7 and claws 8 are similar to this portion of the device described in the first embodiment and that the attaching means are situated upon one side of the wheel only instead of spanning the wheel rim flanges.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A tire-valve guard for pneumatic tires on tractors and the like, comprising in combination a valve-shrouding element adapted to partially enclose the portion of the tire valve projecting inwardly from the rim flange of an associated wheel, said shroud being of semi-cylindrical configuration having tapering flanks, a pair of claws extending from the lower ends of said flanks adapted to engage one rim of said wheel, and means to secure said element to said wheel, said means spanning the said rim flange transversely and engaging the opposite rim of said wheel, and adjustable means connecting said first-mentioned means with said shroud.

2. A tire-valve guard for pneumatic tires on tractors and the like, comprising in combination a valve-shrouding element adapted to partially enclose the portion of the tire valve projecting inwardly from the rim flange of an associated wheel, said shroud being of semi-cylindrical configuration and having tapering flanks extending downwardly and outwardly from the open end of said shroud, a pair of claws extending from the lower ends of said flanks adapted to engage one rim of said wheel, an attaching plate integrally formed with said shroud and extending rearwardly therefrom, a lug formed adjacent the rear of said plate, and means to secure said element to said wheel, said means including an angulated strap spanning said rim flange transversely, a rim-engaging claw on one end of said strap engageable with the opposite rim of said wheel, and adjustable connecting means extending between said strap and said lug.

3. A tire-valve guard for pneumatic tires on tractors and the like, comprising in combination a valve-shrouding element adapted to partially enclose the portion of the tire valve projecting inwardly from the rim of an associated wheel, at least one claw extending from said shroud and adapted to engage one rim of said wheel, means to secure said element to said wheel, said means spanning the rim flange of said wheel transversely and engaging the opposite rim of said wheel, and adjustable means connecting said first-mentioned means with said shroud.

MICHAEL N. BORODIE.

REFERENCES CITED

The following references are of record in the file of this patent:

UNITED STATES PATENTS

| Number | Name | Date |
|---|---|---|
| 1,428,241 | Kercher | Sept. 5, 1922 |
| 1,440,928 | Moore | Jan. 2, 1923 |
| 1,445,102 | Peterson | Feb. 13, 1923 |

FOREIGN PATENTS

| Number | Country | Date |
|---|---|---|
| 412,844 | Germany | May 2, 1925 |